April 20, 1965 S. GODET 3,179,877
LINEAR FUNCTION GENERATORS
Filed April 15, 1960 2 Sheets-Sheet 1

INVENTOR.
SIDNEY GODET
BY
George L. Black
AGENT

April 20, 1965   S. GODET   3,179,877
LINEAR FUNCTION GENERATORS
Filed April 15, 1960   2 Sheets-Sheet 2

INVENTOR.
SIDNEY GODET
BY George L. Black
AGENT

United States Patent Office 3,179,877
Patented Apr. 20, 1965

3,179,877
LINEAR FUNCTION GENERATORS
Sidney Godet, Great Neck, N.Y., assignor, by mesne assignments, to Dynamics Corporation of America, New York, N.Y., a corporation of New York
Filed Apr. 15, 1960, Ser. No. 22,430
7 Claims. (Cl. 323—52)

The present invention relates to function generators, and more particularly to inductive devices for producing a linear output in response to the rotation of an input member.

Inductive devices such as transformers and synchros, for example, are known for producing an output that is a trigonometric function of the relative rotation between primary and secondary windings of the device. Sometimes it is required that a linear output be produced. It has been difficult to attain a smoothly varying linear output with known devices, particularly over a wide range of angles of rotation.

Therefore, it is an object of this invention to provide a function generator for producing an output voltage whose magnitude varies smoothly as a linear function of the rotation of a member over a wide range of angles.

It is a further object to provide such a generator for producing a voltage whose magnitude varies linearly over a range of $\pm 90°$, there being a very high order of linearity over $\pm 20°$.

It is another object to provide a function generator that includes a rotatable inductance winding for producing an output voltage whose magnitude substantially varies as a linear function of the rotation of the winding over $\pm 90°$.

The foregoing objects are atained by providing a function generator that includes an inductive device such as a rotatable transformer having two outputs which are functions of sin $\theta$ and cos $\theta$, respectively, where $\theta$ is the relative angle of rotation between primary and secondary windings of the transformer. One of the outputs is fed back to the primary by a negative feedback amplifier circuit. The feedback is controlled so that the voltage V across the primary winding of the transformer varies in accordance with $$\frac{KE_s}{(1+\frac{1}{2}\cos\theta)}$$

where K is a circuit constant and $E_s$ is an alternating input voltage applied to the function generator.

The invention and other objects and advantages thereof will be understood more clearly from the following detailed description and the accompanying drawings wherein:

FIG. 2 is a schematic diagram of a circuit that incorporates the features of the invention shown in FIG. 1a;

FIG. 3 is a schematic diagram of a different circuit that incorporates the features of the invention shown in FIG. 1a;

Figure 1A:
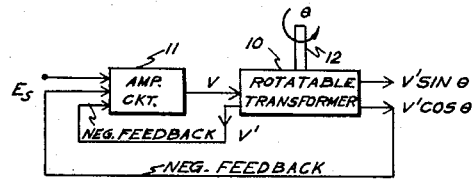
FIG. 1a is a block diagram of a first embodiment of the invention.

Referring now to FIG. 1a, 10 is an inductive device such as a rotatable transformer supplied with a voltage V from a negative feedback amplifier circuit 11 which is supplied with an input alternating voltage signal $E_s$. The transformer produces a first output whose magnitude is equal to $V'$ sin $\theta$ and a second output whose magnitude is equal to $V'$ cos $\theta$. The term $V'$ is a secondary winding voltage that is substantially equal to the voltage V across the primary winding. $\theta$ is the angle of rotation of a shaft member 12, which is rotatable for varying the coupling between primary and secondary windings of the transformer.

The $V'$ cos $\theta$ output is fed back to the amplifier circuit 11 as a negative feedback voltage for positive values of cos $\theta$. The voltage $V'$ also is fed back to the amplifier as a negative feedback voltage. The feedbacks are proportioned so that with $V'$ cos $\theta$ at a maximum, it has a degenerative effect upon the amplifier circuit that substantially is one-half of the degenerative effect caused by the negative feedback voltage $V'$. The voltage V across the primary winding of the transformer varies in accordance with $$\frac{KE_s}{(1+\frac{1}{2}\cos\theta)}$$

where K is a circuit constant. The output voltage $$V' \sin \theta = \frac{KE_s \sin \theta}{(1+\frac{1}{2}\cos\theta)}$$

which varies substantially as a linear function of $\theta$ over $\pm 90°$.

Figure 1B:
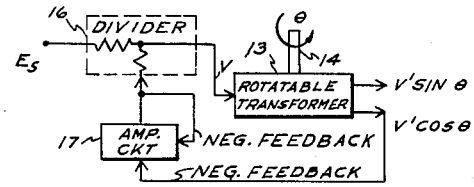
FIG. 1b is a block diagram of a different embodiment of the invention.

A slightly different embodiment of the invention is illustrated in FIG. 1b, where 13 is the rotatable transformer and 14 is the rotatable shaft of the transformer for varying the coupling between its primary and secondary windings. The input to the transformer is obtained from a dividing network 16 excited with an input alternating voltage $E_s$.

The $V'$ cos $\theta$ output of the transformer 13 is fed back to the dividing network 16 through a negative feedback amplifier circuit 17. The resistances of the resistors of divider network 16 are chosen so that the voltage V across the primary of the transformer varies accordance with $$\frac{KE_s}{(1+\frac{1}{2}\cos\theta)}$$

The output produced by the transformer varies substantially as a linear function of $\theta$.

Figure 2:
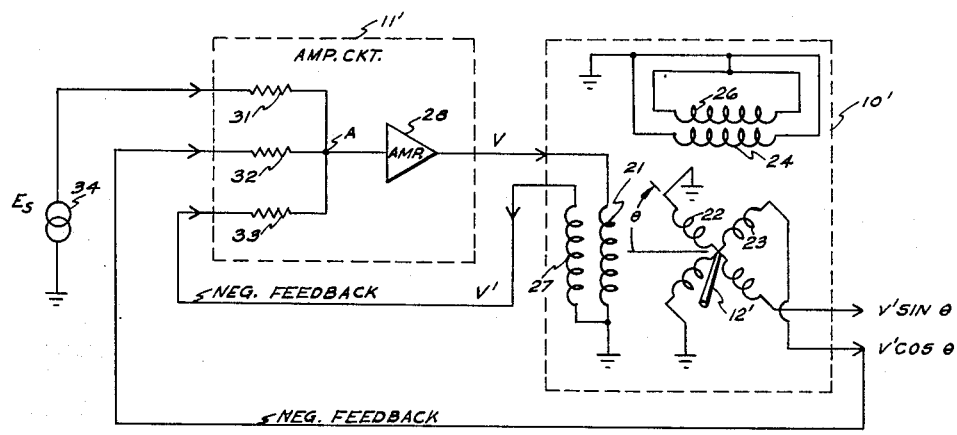

In FIG. 2, which is a more detailed illustration of the invention shown in FIG. 1a, the rotatable transformer 10' is an inductive resolver that has a primary winding 21 and a pair of secondary windings 22 and 23. The winding 21 is part of the stator of the resolver, windings 22 and 23 being part of the rotor, which is turned by a rotatable member 12'.

The secondary windings 22 and 23 are oriented at 90° relative to each other. These windings are rotatable simultaneously with respect to the primary winding 21 for varying the coupling with the primary to vary the output voltage produced by the resolver.

The resolver 10' is provided with another stator winding 24 at right angles with respect to stator winding 21. The winding 24 is not used in this application except for making the resolver more symmetrical. Therefore, the ends of stator winding 24 are shorted to each other and to ground as is illustrated in the drawings.

The resolver 10' is a compensated resolver that has a pair of auxiliary windings 26 and 27 which are similar to the stator windings 24 and 21, respectively. The auxiliary windings are inserted within the same slots that are used to wind the stator to form a compensated resolver such as the type R601 resolver manufactured by the Reeves Instrument Corporation, for example. The ends of the auxiliary winding 26 are shorted to each other and to ground for this application.

The primary winding 21 is supplied with a voltage V from a summing amplifier circuit 11' which includes an amplifying device 28 whose input is connected to the junction of three summing resistors 31, 32 and 33. The resistor 31 is connected to a source 34 of alternating voltage $E_s$ at 60 cycles/sec., for example.

The secondary winding 23 is connected to the summing resistor 32 for feeding back a degenerative voltage to the amplifier device 28 for positive values of cos θ. The compensating winding 27 is connected to the resistor 33 for feeding back a further degenerative voltage to the amplifier device.

The amplifier device 28 preferably is a high gain amplifier, and supplies a signal voltage V to the input winding 21. Ordinarily, the resolver compensating winding 27 would be the only negative feedback to the amplifier for providing an effective gain of unity, whereby the voltage across the resolver secondary winding 22 would follow a sine curve. For positive values of cos θ, if the cosine winding 23 provided the only negative feedback to the amplifier, the voltage output across the resolver secondary winding 22 would follow a tangent curve. By proportioning the negative feedbacks from the compensating winding 27 and the cosine winding 23, the voltage across the winding 22 can be made to follow a curve that lies between a sine curve and a tangent curve, which substantially is linear with the angle θ.

In the system of FIG. 2, the proper relationship between the feedback voltage for the amplifier is obtained by choosing the resistance of resistor 32 so that it is approximately twice that of the resistor 33. The resistance of the resistor 31 is relatively immaterial and merely determines the slope of the curve of the output voltage produced across the winding 22.

Figure 3:
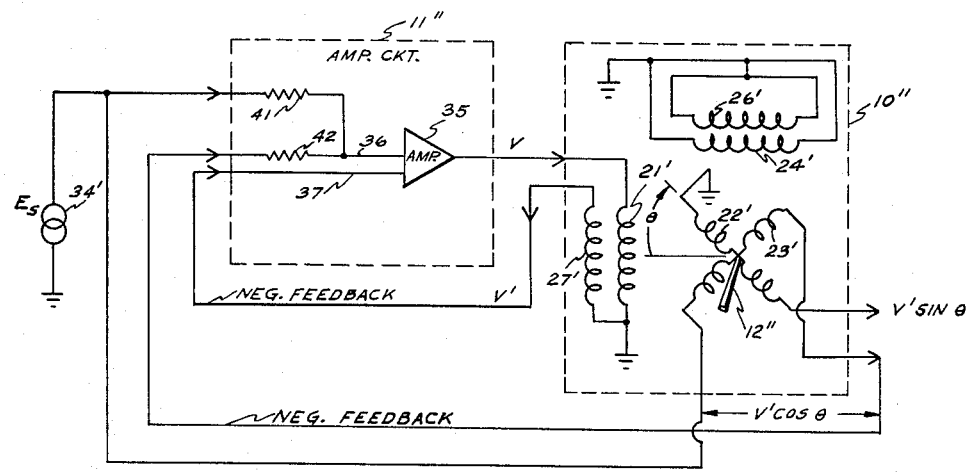

Another form of the invention is illustrated in FIG. 3 where the details of the amplifier circuit 11″ are different from those shown in FIG. 2. The resolver 10″ is the same in FIG. 3 as it is in FIG. 2.

Referring now to FIG. 3, the amplifier device 35 is provided with two separate inputs 36 and 37, respectively. The source 34′ is connected to the first input 36 by a resistor 41. This resistor together with a further resistor 42 provides a divider network for feeding back a degenerative voltage to the amplifier from the cosine winding 23′ of the resolver for positive values of cos θ.

The other input 37 to the amplifier device 35 is connected to the ungrounded end of the auxiliary winding 27′ of the resolver for supplying the amplifier with the other negative feedback that is required.

The $V'$ sin θ output produced by the resolver is made linear by making the resistances of the resistors 41 and 42 substantially equal. Thus, approximately one-half of the voltage across the resolver winding 23′ is fed back to the input 36 of the amplifier as a degenerative voltage for positive values of cos θ. Substantially the full value of the voltage across the auxiliary winding 27′ of the resolver is fed back to the other input of the amplifier.

Figure 4:
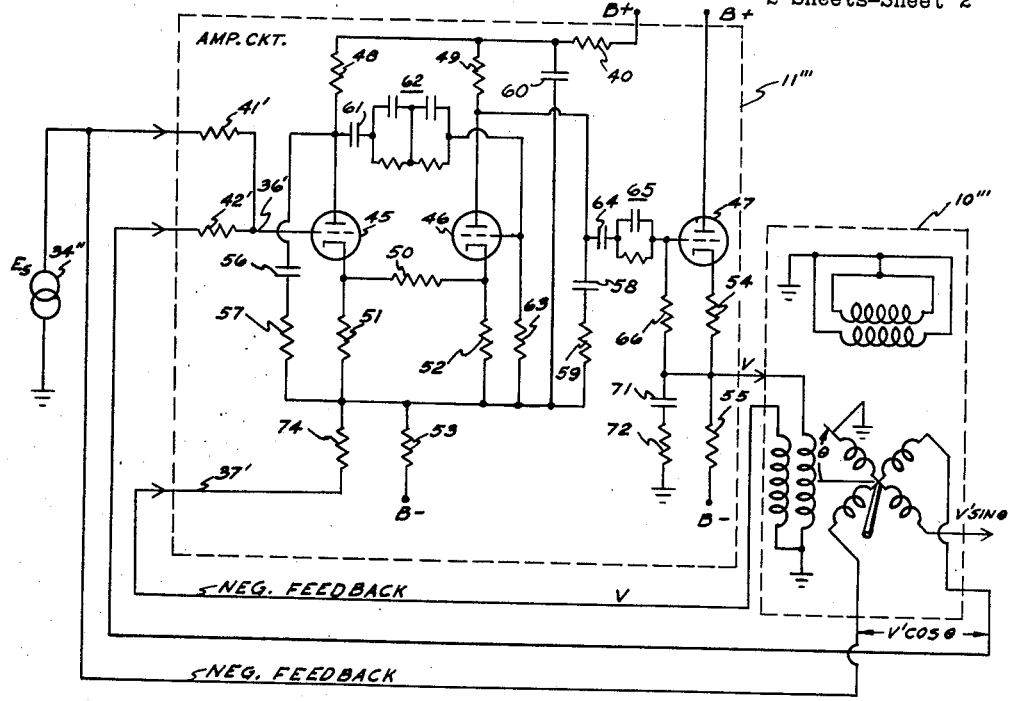
FIG. 4 is a more detailed schematic diagram of the circuit shown in FIG. 3.

The details of the function generator of FIG. 3, including the components of an amplifier circuit similar to the model ARV 151 manufactured by the Reeves Instrument Corporation are illustrated in FIG. 4. Referring to FIG. 4, the amplifier circuit includes a first amplifier tube 45, a second amplifier tube 46 and a cathode follower tube 47.

The anodes of tubes 45 and 46 are connected to a source of B+ operating potential through a pair of resistors 48 and 49, and a common resistor 40. The cathodes of tubes 45 and 46 are connected to each other by a resistor 50. They are also connected to a source of B− operating potential by resistors 51, 52 and a common resistor 53. A by-pass capacitor 60 is coupled between the junction of resistors 40, 48, 49 and the junction of resistors 51, 52, 53. The resistance of the resistor 53 is chosen so that the D.-C. voltage at the junction between resistors 51-53 provides the proper tube bias when the grid of tube 45 is at ground potential.

The anode of the cathode follower tube 47 is connected to another source of B+ operating potential. The cathode of this tube is connected to a B− source of potential through resistors 54 and 55.

A capacitor 56 and a resistor 57 are connected between the anode of tube 45 and the junction between resistors 51-53 to provide a low-frequency wave shaping network for the amplifier. A further capacitor 58 and a resistor 59 are connected between the anode of tube 46 and the junction between the resistors 51-53 for the same reasons.

The output signal at the anode of the tube 45 is supplied to the grid of the tube 46 through a coupling capacitor 61 and a high-frequency wave shaping network 62. The resistor 63 between the grid of tube 46 and the junction of resistors 51-53 constitutes the grid load impedance for this signal.

The output signal at the anode of tube 46 is supplied to the grid of the cathode follower tube 47 by coupling capacitor 64 and a further high-frequency wave shaping network 65. The resistor 66 constitutes the grid load impedance for this signal.

The ungrounded end of the primary winding of the resolver 10‴ is connected to the junction between resistors 54 and 55 for receiving the output voltage V from the amplifier circuit. A series circuit consisting of a capacitor 71 and a resistor 72 is connected across the primary winding for insuring that its impedance is substantially resistive at the signal frequency.

The ungrounded end of the compensating winding of the resolver is connected to the cathodes of tubes 45 and 46 by a trimming resistor 74. Thus, the signal voltage developed across the compensating winding of the resolver is applied to the cathode of the tube 45 as a degenerative voltage.

The other input lead 36′ to the amplifier is connected to the junction between resistors 41′ and 42′ which form a voltage divider network for applying degenerative feedback voltage from the secondary winding of the resolver. In an actual embodiment of the invention, the values of resistors 41′ and 42′ were equal so that approximately one-half of the $V''$ cosine θ voltage across the secondary winding of the resolver is applied to the grid of the tube 45.

Figure 5:
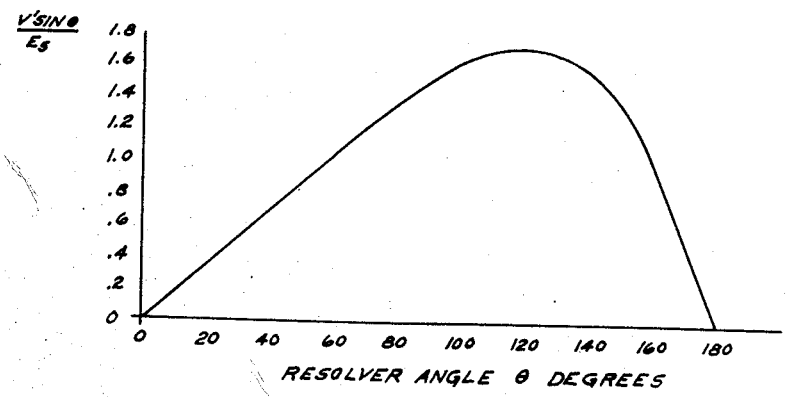
FIG. 5 is a curve of the magnitude of the output voltage as a function of the relative rotation between the primary and secondary windings of the transformer over 180° for positive values of $\theta$.

A curve of the ratio of the output voltage $V'$ sin θ to the input voltage $E_s$ for values of θ from 0° to 180° is shown in FIG. 5, where K=1.5. The output for negative values of θ is equal to the negative of the corresponding output for positive values of θ. This curve has a very high order of linearity between −20° and +20°, and reasonable good linearity from over the range of −90° to +90° Comparing this curve with a straight line having a slope equal to that of the illustrated curve at 0°, the error (departure from linearity) is .00165 degree for θ=20°, and approximately 4 degrees for θ=90°.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:

1. A linear function generator comprising a rotatable transformer having first and second outputs for providing first and second signals whose magnitudes vary as the sine and cosine, respectively, of the angular position of a rotatable member coupled to said rotatable transformer, first means coupled to said rotatable transformer for supplying said rotatable transformer with an alternating input signal, second means coupled to said first means for coupling a negative feedback signal from one of the outputs of said rotatable transformer to said first means, an amplifier circuit included within one of said first or second means, and additional means coupled to said amplifier circuit for coupling a negative feedback signal from the output of said amplifier circuit to the input of said amplifier circuit, said negative feedback signals being proportioned so that the maximum degenerative effect produced by the feedback signal from said second means is substantially one-half the degenerative effect produced by the feedback signal from said additional means.

2. A linear function generator comprising in combination, a variable coupling device including a rotatable transformer, said variable coupling device having an input and first and second outputs for providing first and second output signals whose magnitudes vary as the sine and cosine, respectively, of the angular position of a rotatable member coupled to said variable coupling device, first means coupled to said variable coupling device for supplying an alternating voltage to the input of said variable coupling device, second means for coupling a negative feedback signal from one of the outputs of said variable coupling device to said first means, amplifier means included within one of said first or second means, and additional means for coupling a negative feedback signal from the output of said amplifier means to the input of said amplifier means, said negative feedback signals being proportioned so that the maximum degenerative effect produced by the feedback signal from said second means is substantially one-half the degenerative effect produced by the feedback signal from said additional means.

3. A linear function generator comprising an inductive device having primary and secondary windings for producing first and second output voltages whose magnitudes vary as the sine and cosine, respectively, of the angular position of a rotatable member coupled to said inductive device, input means coupled to the primary winding of said inductive device for supplying an alternating signal voltage to said inductive device, and first negative feedback means connected between one of the outputs of said inductive device and said input means, one of said means including an amplifier circuit having additional negative feedback means between its output and input, the negative feedback from said first negative feedback means and said additional negative feedback means being proportioned so that the maximum degenerative effect produced by the feedback from said first negative feedback means is substantially one-half the degenerative effect produced by the feedback from said additional negative feedback means for causing the voltage across said primary winding to vary in accordance with the equation $$\frac{KE_s}{(1+\frac{1}{2}\cos\theta)}$$

where K is a circuit constant, $E_s$ is the magnitude of said alternating signal voltage, and $\theta$ is the angular position of said rotatable member.

4. A linear function generator comprising a rotatable transformer having a primary winding and having two secondary windings that are rotatable with respect to said primary winding, said secondary windings producing first and second voltages whose magnitudes vary as the sine and cosine, respectively, of the angular position between said primary and secondary windings, input means including an amplifier circuit coupled to said primary winding for supplying an alternating input voltage to said primary winding, means for feeding back a first degenerative signal to said amplifier circuit from its output, and further means coupled from one of the secondary windings of said rotatable transformer to said amplifier circuit for feeding back a further degenerative signal, the ratio of said first degenerative signal to the maximum value of said further degenerative signal being substantially two to one, the voltage across said primary winding varying in accordance with the equation $$\frac{KE_s}{(1+\frac{1}{2}\cos\theta)}$$

where K is a circuit constant, $E_s$ is the magnitude of said alternating input voltage, and $\theta$ is the angular position between said primary and secondary windings.

5. The combination of a resolver having a stator winding and a pair of rotor windings for producing first and second output voltages whose magnitudes vary as the sine and the cosine, respectively, of the angular position between the stator and rotor windings, a compensating winding associated with said stator winding, input means coupled to said stator winding for supplying an applied alternating signal to said stator winding, means connected to said compensating winding and to said input means for feeding back a first degenerative signal to said input means, and further means connected to one of said rotor windings and to said input means for feeding back a further degenerative signal to said input means, the magnitude of said first degenerative signal being substantially twice the maximum magnitude of said further degenerative signal, the voltage across said stator winding varying in accordance with the equation $$\frac{KE_s}{(1+\frac{1}{2}\cos\theta)}$$

where K is a circuit constant, $E_s$ is the magnitude of said applied alternating signal, and $\theta$ is the angular position between said stator and rotor windings.

6. A linear function generator comprising a rotatable transformer having a primary winding and a compensating winding and having two secondary windings rotatable with respect to said primary and compensating windings, means including an amplifier coupled to said primary winding for supplying said primary winding with an applied alternating voltage, a first resistor having one of its end terminals connected to said compensating winding, a second resistor having one of its end terminal connected to one of said secondary windings, the other end terminals of said first and second resistors being connected to the input of said amplifier for coupling negative feedback signals to said amplifier, said second resistor having a resistance value approximately twice that of said first resistor for proportioning said negative feedback signals so that the output from the other of said secondary windings is a linear function of the angular position between said primary and secondary windings.

7. A linear function generator comprising a rotatable transformer having a primary winding and a compensating winding, said rotatable transformer further having two secondary windings which are rotatable with respect to said primary and compensating windings, means including an amplifier coupled to said primary winding for supplying said primary winding with an alternating voltage, said amplifier having two inputs, means connecting said compensating winding to one of said inputs for feeding back a first degenerative voltage to said amplifier, and further means connecting one of said secondary windings to the other of said inputs for feeding back a second degenerative voltage to said amplifier, said degenerative voltages being proportioned to have a relationship such that the maximum magnitude of said second degenerative voltage is one-half the magnitude of said first degenerative voltage for causing the magnitude of the output voltage across the other secondary winding to be a linear function of the angular position between said primary and secondary windings.

References Cited by the Examiner
UNITED STATES PATENTS

| | | | |
|---|---|---|---|
| 2,467,646 | 4/49 | Agins | 323—113 X |
| 2,791,744 | 5/57 | Carney | 323—109 |
| 2,874,352 | 2/59 | Darbin | 323—109 |
| 2,975,972 | 3/61 | Dworetzky | 235—186 |

LLOYD McCOLLUM, *Primary Examiner.*

MILTON O. HIRSHFIELD, *Examiner.*